Patented July 1, 1952

2,602,050

UNITED STATES PATENT OFFICE 2,602,050

TETRATHIOETHERS OF PENTAERYTHRITOL

Robert T. Sanderson, Gainesville, Fla., assignor to The Texas Company, New York, N. Y., a corporation of Delaware No Drawing. Application July 15, 1949, Serial No. 105,039

3 Claims. (Cl. 252—45)

This invention discloses a novel class of thioethers. The liquid members of this novel class of compounds possess chemical and physical properties which make them excellent synthetic lubricants.

The novel class of compounds of this invention comprises the tetrathioethers of pentaerythritol having the general formula

wherein R, R', R'', R''' are aliphatic heterocyclic or aromatic radicals which may be identical or dissimilar. Tetra-2-ethylhexyl thioether of pentaerythritol and di-2-ethylhexyl, di-n-dodecyl thioether of pentaerythritol are representative members of this novel class of compounds; tetraphenyl thioether of pentaerythritol is an example of the novel compounds of this invention, wherein the hydrocarbon radicals are aromatic.

The tetrathioethers of pentaerythritol are high boiling liquids or solids depending on the molecular weight of the hydrocarbon radicals. Tetra-2-ethylhexyl thioether of pentaerythritol and di-2-ethylhexyl, di-n-dodecyl thioether of pentaerythritol are both high boiling liquids. The following table demonstrates that the high boiling liquid tetrathioethers of this invention possess properties which adapt them for use as synthetic lubricants.

TABLE I

| | Pour Point °F. | Kinematic 100°F. | Viscosity 210°F. | V. I. | Flash Point °F. |
|---|---|---|---|---|---|
| Tetra-2-ethyl-hexyl thioether of pentaerythritol | −65° | 37.44 | 6.35 | 128 | |
| di-2-ethylhexyl, di-n-dodecyl thioether of pentaerythritol | 0 | 43.43 | 7.91 | 143.5 | 510 |

Tetrathioethers of this invention may be prepared by the familiar Williamson ether synthesis involving the reaction of an alkyl halide with an alkali mercaptide. For example, tetra-2-ethylhexyl thioether of pentaerythritol results from the reaction of four mols of sodium-2-ethylhexyl mercaptide and pentaerythrityl tetrabromide. While the Williamson method is a preferred mode of synthesis for the novel class of compounds of this invention, it is not intended to limit the novel compounds of this invention to any mode of preparation since other methods of thioether synthesis may be employed.

While the properties of the high boiling liquid members of the novel class of compounds of this invention characterize them as excellent synthetic lubricants, it will be understod that the novel tetrathioethers of pentaerythritol possess a plurality of other uses. For example, the tetrathioethers of pentaerythritol are good plasticizers, solvents, and may be employed as chemical intermediates in the preparation of other high molecular weight compounds.

The following examples illustrate the preparation of the novel compounds of this invention. Tetra-2-ethylhexyl thioether of pentaerythritol is prepared in Example I and di-2-ethylhexyl, di-n-dodecyl thioether of pentaerythritol is prepared in Example II.

Example I 73 g. of 2-ethyl hexyl mercaptan, 20 g. of sodium hydroxide and 300 cc. of formula 30 alcohol were mixed and heated under reflux until the sodium hydroxide dissolved. 39 g. of pentaerythrityl tetrabromide was added to the mixture, which was then refluxed for 44 hours. On cooling, the reaction mixture comprises a supernatant alcohol layer, a clear colorless oil layer, and a white crystalline solid. After removal of the crystalline solid by filtration, the oil layer was washed with formula 30 alcohol and was dissolved in ether. The ether solution was washed with water, dried and evaporated. After evaporation of the ether, there was obtained 61 g. of product from which 4 g. of oil distilling at 107 to 116° C. was removed by vacuum distillation at 1 mm. Thereafter, the distillation residue was filtered through Filter Cel to yield tetra-2-ethylhexyl thioether of pentaerythritol. Analysis of this tetrathioether indicated that it contained 21.20 per cent sulphur, 66.72 per cent carbon, and 11.57 per cent hydrogen as compared with calculated theoretical values of 21.62 per cent, 66.82 per cent and 11.56 per cent for the elements in the order named. The tetrathioether has a refractive index, $N_D^{20}$, of 1.5042 and a density, $D_4^{20}$, of 0.9475.

Example II 404 g. of n-dodecyl mercaptan, 292 g. of 2-ethylhexyl mercaptan, 160 g. of sodium hydroxide, 200 cc. of formula 30 alcohol and 388 g. of pentaerythrityl tetrabromide were mixed and heated under reflux for 16 hours. Another 10 g. of sodium hydroxide and 50 g. of n-dodecyl mercaptan were added to the reaction mixture, which was then heated under reflux for another 48 hours. On cooling, the product consisted of supernatant alcohol layer, a clear colorless oil layer, and a white crystalline solid which was removed by filtration.

After washing with formula 30 alcohol, the oil layer was dissolved in ether. The ether solution was water washed, dried and evaporated. A small amount of oil distilling at 107 and 116° C. was removed from the product by vacuum distillation at 1 mm., after which there remained 623 g. of product. This product was filtered through Filter Cel to yield di-2-ethylhexyl, di-n-dodecyl thioether of pentaerythritol. Analysis of this tetrathioether indicated that it contained 17.86 per cent sulphur, 69.86 per cent carbon and 11.93 per cent hydrogen, as compared with calculated theoretical values of 18.18 per cent, 69.82 per cent and 12.00 per cent for the elements in the order named. The tetrathioether had refractive index, $N_D^{20}$, of 1.4984 and a density $D_4^{20}$, of 0.9337.

The value of these compounds as synthetic lubricants has been demonstrated by the properties summarized in Table I.

The foregoing examples illustrate one mode of preparation of the novel pentaerythritol-tetrathioethers of this invention. Other aliphatic and aromatic radicals may be employed to form symmetrical or unsymmetrical tetrathioethers of pentaerythritol. The phenyl, benzyl, thienyl, furfuryl and nonyl radicals are examples of hydrocarbon radicals which can be substituted in the general formula

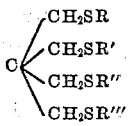

defining the novel pentaerythritol thioethers of this invention.

Excellent lubricants are obtained by mixing a portion of a liquid tetrathioether of pentaerythritol, such as, tetra-2-ethylhexyl thioether of pentaerythritol, with major quantities of a mineral oil fraction having lubrication properties. The pentaerythritol tetrathioethers may be employed in major or minor amounts in such lubricants, but it is preferred to use them as additives, i. e., in minor quantities from 0.5 to 25 per cent of the total lubricant.

Obviously, many modifications and variations of the invention, as hereinbefore set forth, may be made without departing from the spirit and scope thereof, and therefore, only such limitations should be imposed as are indicated in the appended claims.

I claim:

1. An improved mineral oil composition comprising a mineral oil fraction of lubricating properties and 0.5 to 25 per cent tetra-alkylthioether of pentaerythritol.

2. An improved mineral oil composition comprising a mineral oil fraction of lubricating properties and 0.5 to 25 per cent tetra-2-ethylhexyl thioether of pentaerythritol.

3. An improved mineral oil composition comprising a mineral oil fraction of lubricating properties 0.5 to 25 per cent and di-2-ethylhexyl, di-n-dodecyl thioether of pentaerythritol.

ROBERT T. SANDERSON.

REFERENCES CITED

The following references are of record in the file of this patent:

UNITED STATES PATENTS

| Number | Name | Date |
| --- | --- | --- |
| 2,160,116 | Bode | May 30, 1939 |
| 2,278,224 | Subkow | Mar. 31, 1942 |
| 2,423,344 | Rigby | July 1, 1947 |
| 2,472,318 | Subkow | June 7, 1949 |